UNITED STATES PATENT OFFICE.

DITTMAR FINKLER, OF BONN, GERMANY.

PROCESS OF OBTAINING SOLUBLE ALBUMEN.

SPECIFICATION forming part of Letters Patent No. 661,211, dated November 6, 1900.

Application filed July 7, 1899. Serial No. 723,106. (No specimens.)

*To all whom it may concern:*

Be it known that I, DITTMAR FINKLER, a subject of the German Emperor, and a resident of Bonn-on-the-Rhine, in the German Empire, have invented certain new and useful Improvements in the Manufacture of Albumose; and I do hereby declare the following to be a full, clear, and exact description of the invention, such as will enable others skilled in the art to which it appertains to make and use the same.

As is well known, the nutritive properties of albumen are highest when the albumen is in a soluble form, as it is then most readily assimilated by the animal system; and my invention has for its object a process of manufacture of soluble albumen from natural crude albumen or albuminous substances.

Various means have before my invention been resorted to in the production of soluble albumen from natural crude albumen or albuminous substances, the product being known as "albumose." In this form, as will presently be explained, the albumose does not possess the qualities and properties of pure soluble albumen, even if every precaution is taken to prevent peptonization.

It is known that the percentage of gelatine-yielding constituents is very high in those materials which are generally used in the manufacture of albumose—as, for instance, the residues resulting from the manufacture of meat extracts. In fact, the percentage is higher than has hitherto been supposed and under certain circumstances is as high as from fifteen to twenty per centum. The nutritive property of gelatin is, however, very low in comparison with that of albumen, chiefly because gelatin is not suitable to the building up of the animal system, because it is immediately consumed the moment it passes into the system. According to Voit, for example, rats fed for a considerable length of time exclusively on gelatinous food invariably died of starvation, and in the manufacture of albumose by well-known methods no account has been taken of the fact that gelatin possesses no nutritive properties, and consequently cannot take the place of albumen, which, as is well known, is highly nutritive, and, furthermore, I may refer to other facts hitherto unknown. For instance, if a gelatinous substance is treated with a view to obtaining albumose, and the albumen is albumosed, during the latter operation a portion of the albumen-like gelatin is converted into peptone. Besides this the gelatinous substance is converted into gelatin, gelatin albumose, and gelatin peptone, resulting in a compound of gelatin peptone, gelatin albumose, and albuminous albumose. In order to avoid the formation of peptone, it is necessary to interrupt the process at the required moment.

According to experiments which have led to the present invention, the formation of peptone, which proceeds from the conversion of the gelatin, begins during the albumosing of the albumen, so that if the process is arrested when or before the formation of the peptone takes place but a comparatively small proportion of the albumen in the raw material is albumosed or converted into a soluble form, so that the production of soluble albumen by the process described is not a practical one, while the product itself is of little value in that it contains a comparatively large amount of gelatin or gelatin products relatively to the amount of soluble albumen. This fact also renders the product generally used for the consumption of invalids and convalescents of little value, owing to its low nutritive properties as compared with pure soluble albumen, as in the nourishment of invalids and convalescents it is essential that the system be supplied with nitrogenous organic food. Although albumose has proved efficacious in a few cases, yet in such cases as necessitate the administration of large doses of the compound the desired results could not be obtained. It follows that the desired results can only be obtained by completely eliminating from the albuminous raw material not only the gelatin, but those products which will yield gelatin, together with substances other than albumen which are generally dissolved during the albumosing process, and carrying out the latter process after the elimination of the undesired constituents referred to, and these cannot be removed by mere washing or boiling with water.

The main object of my invention lies, therefore, in the complete elimination of said undesirable constituents, and to this end I proceed as follows:

The albuminous material is first loosened or swelled by washing it with acidulated water in such a manner that the loosening fluid converts the gelatin-yielding material down to the muscular fibers into gelatine. For this purpose it is advantageous that the said acidulated water may contain from 0.1 to two per cent. of a suitable acid—as, for instance, hydrochloric acid—the washing being consequently effected in such a manner that the loosening fluid converts the gelatin-yielding material down to the muscular fibers into gelatin even at the risk of losing a small portion of the albumen. This is practically done at a temperature which may vary from about 60° centigrade to boiling-point, pressure being dispensed with. This operation has for its result the thorough permeation of the muscular fibers by the washing liquor and the conversion of the gelatin-yielding constituents into gelatin, which is at the same time dissolved out, though there may be a trifling loss in albumen, especially when meat-flour, such as results in the manufacture of meat extracts, is used, wherein the albumen is contained in a coagulated form, while the small quantity of soluble albumen and myosine present are either eliminated or rendered insoluble during the manufacture of the extract. The described treatment (more especially intended for the said meat-flour or the like) is also applicable to fresh meats, the major portion of the albumen remaining behind. In either case the loss in albumen resulting in the elimination of the gelatin or gelatin-yielding constituents by my process of washing is comparatively very small.

In practice the described operation of washing is repeated with fresh acidulated water until tannic reaction ceases, while the gelatin, if any of it remains, will be precipitated by the tannic acid. The raw material thus freed from gelatin and gelatin-yielding constituents is now ready for further treatment. Inasmuch as a portion of the mineral acid is present after the washing, acid albumen is formed, which is a step toward the albumose, the acid albumen being a product intermediate of albumen and albumose, and this acid albumen is then subjected to the usual albumosing process as follows: The raw material is boiled for three or four hours or longer in from ten to twenty times its weight of water, which latter may be acidulated with about fifty per cent. of a mineral acid, as hydrochloric acid, or may hold in solution a small quantity—as, for instance, 0.5 per cent.—of an alkali, as carbonate of soda, or soda or the like. The albumosing process may be accelerated by heating the material under treatment in a closed vessel and under a pressure above normal, as from one to two atmospheres, whereby the boiling is reduced to from one to two hours. In either case the albuminous constituents are rendered soluble or, in other words, they are albumosed. Inasmuch as neither gelatin nor gelatin-yielding constituents are present, the product is practically a mass of albumen-albumose.

Of course the albumosing process should not be carried too far in order to prevent the formation of peptones, and since no gelatin is present and the peptonizing of the albumen does not take place until after the albumosing process is completed the formation of peptones can be readily avoided in albumosing practically the whole or main bulk of the albumen.

From the following examples my invention and the mode of practicing the same will be readily understood by those conversant with this branch of the arts.

One kilo of the albuminous material freed from gelatin and gelatin-yielding constituents, as hereinbefore described, is boiled in ten liters of water, containing about 0.5 per cent. of hydrochloric acid, for three or four hours, freed from liquid by filtration, neutralized, again filtered, and finally dried by evaporation; or one kilo of raw material freed from gelatin and gelatin-yielding constituents is mixed in a wet condition with ten kilos of a 0.5-per-cent. hydrochloric-acid solution, heated and subjected to a pressure of about three atmospheres for about two hours, freed from liquid, neutralized, &c., as above; or one kilo of raw material, freed, as set forth, from gelatin and gelatin-yielding constituents, is heated with ten kilos of a 0.5-per-cent. soda-lye for two hours under a pressure of three atmospheres, then filtered, neutralized, &c., as above.

Having thus described my invention, what I claim as new therein, and desire to secure by Letters Patent, is—

1. The process of obtaining soluble albumen from natural crude albuminous substances, which consists in removing the gelatin and gelatin-yielding constituents by washing with acidulated water of suitable temperature, albumosing the resultant product in the usual manner and arresting the latter process before peptonization of the albumen sets in, substantially as set forth.

2. The process of obtaining soluble albumen from albuminous animal substances, which consists in freeing the latter from gelatin and gelatin-yielding constituents by washing in acidulated water heated to from 60° to 100° centigrade, until tannic acid ceases to react upon the wash-water, then albumosing the product in the usual manner, arresting the latter process before peptonizing of the albumen sets in, and neutralizing and drying the soluble albumen thus obtained, substantially as and for the purpose set forth.

In testimony that I claim the foregoing as my invention I have signed my name in presence of two subscribing witnesses.

DITTMAR FINKLER.

Witnesses:
HANS LICHTENFELT,
WILLIAM H. MADDEN.